US012797648B2

(12) United States Patent
Ponce Hernandez

(10) Patent No.: US 12,797,648 B2
(45) Date of Patent: Nov. 17, 2026

(54) ADAPTABLE EPAS HOODS FOR ACIDIC AND CONTAMINATED ENVIRONMENTS

(71) Applicant: EPAS LTDA, Región de Valparaíso (CL)

(72) Inventor: Juan Carlos Ponce Hernandez, Rinconada de los Angeles (CL)

(*) Notice: Subject to any disclaimer, the term of this patent is extended or adjusted under 35 U.S.C. 154(b) by 0 days.

(21) Appl. No.: 19/368,550

(22) Filed: Oct. 24, 2025

(65) Prior Publication Data

US 2026/0131174 A1 May 14, 2026

(51) Int. Cl.
*A62B 17/04* (2006.01)
*A42B 1/04* (2021.01)

(52) U.S. Cl.
CPC ................ *A62B 17/04* (2013.01); *A42B 1/04* (2013.01)

(58) Field of Classification Search
CPC .... A41D 13/1218; A62B 17/00; A62B 17/04; A61F 9/02
See application file for complete search history.

(56) References Cited

U.S. PATENT DOCUMENTS

| | | | | |
|---|---|---|---|---|
| 2005/0193472 A1* | 9/2005 | Courtney | ............... | A62B 17/04 2/202 |
| 2017/0188651 A1* | 7/2017 | Brust | ..................... | A42B 1/045 |
| 2020/0179732 A1* | 6/2020 | Alleyne | ............... | A62B 17/006 |
| 2022/0184428 A1* | 6/2022 | Tew | ....................... | A41D 27/02 |

* cited by examiner

*Primary Examiner* — Katherine M Moran
(74) *Attorney, Agent, or Firm* — Ruben Alcoba, Esq.

(57) ABSTRACT

A detachable hood provides head, neck, and chest protection from contaminating agents. The hood is composed of an anti-acid polyurethane fabric with polyester thread stitching and a polyurethane sealing band disposed on the stitching. The hood features a pair of elastic bands disposed on the polyurethane fabric that defines a 20 mm channel between them. A double-sided tape is disposed within the channel and is configured to adhere the fabric to the edge of a full-face mask to create a hermetic seal. In another embodiment, the hood includes a frontal opening, and the pair of elastic bands are disposed along its diameter, providing resistance and elasticity to the opening to allow for adaptation to different mask models.

7 Claims, 9 Drawing Sheets

ADAPTABLE EPAS HOODS FOR ACIDIC AND CONTAMINATED ENVIRONMENTS

CROSS REFERENCE TO RELATED APPLICATIONS

Figure 1:
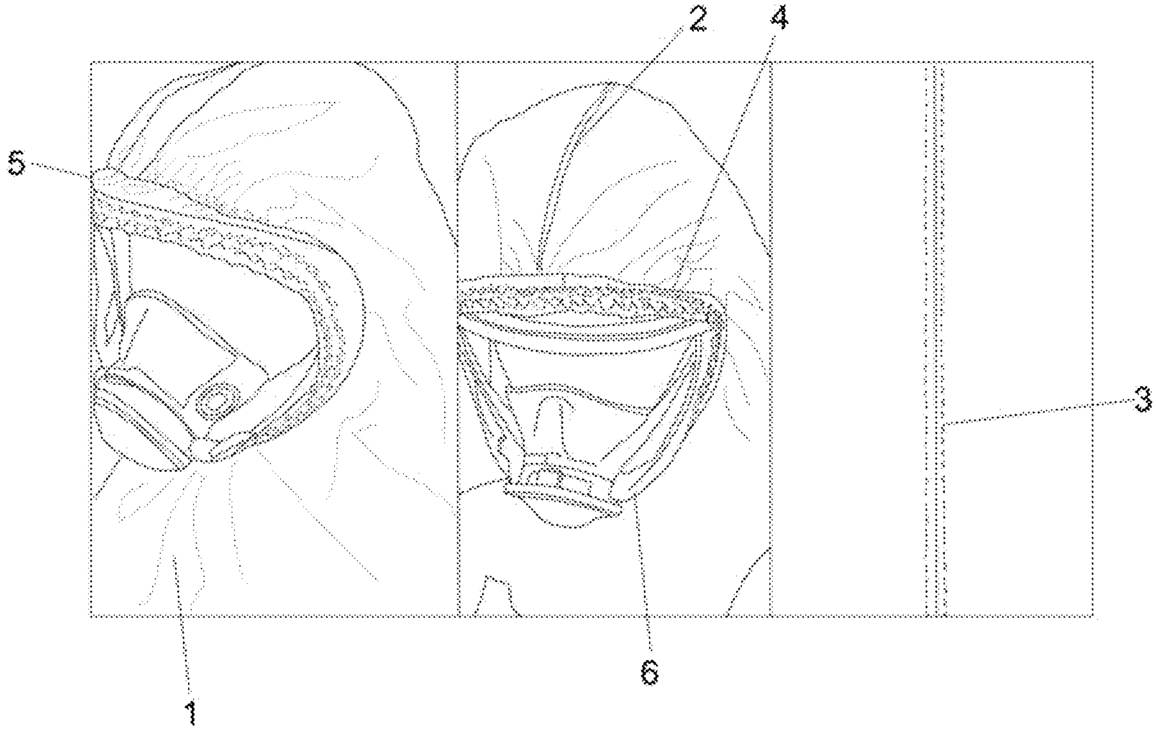

This application claims priority to Chilean Patent Application No. 202403423, filed on Nov. 8, 2024, with the Instituto Nacional de Propiedad Industrial (INAPI) of Chile. The entire disclosure of the above-identified application is hereby incorporated by reference.

BACKGROUND

The present application deals with Personal Protective Equipment (PPE) for the head, specifically a protective hood for the neck and head with resistance to contaminated environments, such as sulfuric acid, suspended dust, chemical mining dust, and other environmental agents.

State of the Art

Currently, Personal Protective Equipment for contaminated environments, with suspended dust, chemical mining dust, and other agents, dates to paper suits, overalls, boots, gloves, and half-face or full-face respiratory protection. Regarding respiratory protection, there are a series of protection models that include headpieces with visors, which, in general, are attached to paper hoods or various textile types depending on the protection function (example: welder's hoods tend to be cotton with Kevlar; flame-retardant hoods made of aluminum; among others).

Regarding the latter, textile or paper hoods exist on the market as part of a respiratory protection pack (which includes a headpiece with a visor and sometimes an electric air supply via batteries and a motor-fan), being part of a particular respiratory protection model; therefore, their use is reduced exclusively to a single respiratory protection model. This is the case, for example, of the Versaflo polypropylene hood, adapted exclusively to the Versaflo S-605-10 visor ("Versaflo S-Series Hoods Technical Data Sheet" pgs. 1 and 2, stock numbers S-533:52-0000-4597-2), or also, the BLS 5700/c anti-acid hood belonging to the BLS full-face mask ("BLS 5700C Short Anti-Acid Hood Technical Data Sheet" pg. 1, code 108274).

Furthermore, both paper and anti-acid hoods are designed to fit each one on the corresponding full-face visor; therefore, the front opening of the element towards the face is calculated for that particular model.

With this new invention model, we generate a utility not developed in the Personal Protection Equipment market, because the detachable EPAS HOODS (in their paper and acid-resistant versions) have a frontal opening towards the face with a double-elastic system, which gives it flexibility and, consequently, the possibility of adhering and adapting to the different models of full-face protection visors available.

Technical Problem

The main drawback is that the hoods currently on the market are designed for a specific model, not being feasible to use on other types of visors or face shields. This generates rigidity in their utility, reducing their functionalities. Employers, procurement departments, and those whose duties include the purchase of Personal Protection Equipment, must broaden their range of PPE, or it forces them to obtain complete respiratory protection kits, considering that the existing hoods will only serve them for a particular model, which they will also be forced to use.

There are also polyaramid textile hoods, which give them resistance and elasticity, but they are similarly designed for specific respiratory protection models, in addition to being permeable, which implies downtime for washing-drying processes. Additionally, because current hoods are not hermetic nor completely sealed around the contours of their visors, gaps are created, points where contamination could easily enter in the case of fine particulate matter, exposing workers'skin to direct contact with hazardous chemical substances, a very recurrent problem in sulfuric acid plants. Same case for full-body polyethylene suits, where the main failure point is at the lower edge of the face below the chin, a point not protected by the full-face mask nor by the hood of all these Tyvek-type suits.

This problem arises because the suits tend to open up due to the pressure exerted by the opening and expansion of the worker's shoulders on their closure system, which ultimately generates an opening and consequently skin exposed to concentrated acids, leaving a high probability of direct skin contact for the worker with acid mud, drops, or gas, which would eventually cause serious burns and injuries. It should be noted that neither snaps nor adhesive VELCRO® patches manage to prevent this opening from occurring.

It is for this reason that many workers who perform their duties in these types of spaces must resort to improvisations and seal the exposed areas with commercial tapes, materials which, likewise, with use and repetitive movements, tend to peel off. Additionally, at the time of removal, they entail a certain degree of difficulty due to contact with the acid impregnated on them, which may remain as a residue.

These problems have generated a series of visits by workers to their facility's health care centers (polyclinics) and, in some cases, have had to be referred to their OAL (Administrating Bodies of Law 16.744), when the level of irritation and/or burns warrants it. This, without considering the recovery times that these injuries imply, the negative impact on their occupational health and safety indicators, as well as the internal reorganization that workplaces must generate with the available team.

Solution of the Invention

Thus, the need arises to develop a hermetic hood that does not allow the entry of contaminating agents, whose use is not limited to a specific visor model, and that, at the same time, provides resistance and the practicality of quick cleaning in the case of the acid-resistant hood.

On one hand, the anti-acid PVC EPAS HOOD, being made of a waterproof material with acid resistance, can be quickly washed and disinfected with cleaning materials such as wet wipes and subsequently dried with absorbent material, and by being made of acid-resistant textile material, they will have a useful life of sufficient use, not to mention that it has an added flexibility, due to its manufacturing technique, where the frontal opening of the hood incorporates a system for attaching to visors with double elastication, which allows it to adapt to different models of facial protection.

These advantages, in short, will allow organizations to substantially reduce the aforementioned problems, due to their cleanability and reusability, as well as the versatility of use in different respiratory protection models.

On the other hand, the paper EPAS HOOD, made of polyethylene, allows for effective isolation and protection of the upper back, neck, shoulders, and head of the worker from suspended dust present in work environments, attaching firmly to the sides of the full-face visors by means of the elasticated system in its frontal opening.

Like the anti-acid hood, it has added versatility of use in different respiratory protection models. It is not reusable.

SUMMARY

The present invention is directed to a detachable protective hood for protecting the head, neck, and chest of a user from exposure to contaminating agents, such as acids and dust.

The prior art suffers from several disadvantages. Existing protective hoods are often designed to be compatible with only one specific model of full-face mask, limiting their utility and versatility. Furthermore, many existing hoods and full-body suits fail to create a hermetic seal, particularly in the area between the user's chin and the bottom of the mask, creating gaps where fine particulate matter and hazardous chemical agents can enter. This exposure can lead to skin irritation and chemical burns. Additionally, some existing fabric hoods are permeable and, when contaminated, require long-duration washing and drying processes, leading to significant equipment downtime.

The present invention aims to solve these problems. An object of the present invention is to provide a detachable hood that is universally adaptable to various models of full-face masks. Another object is to provide a hood that creates a hermetic seal against contaminants. A further object of the invention is to provide a protective hood made from a durable, anti-acid, and waterproof material that can be quickly and easily cleaned and reused, minimizing downtime.

These objects are achieved in one embodiment by a detachable hood comprising an anti-acid polyurethane (PU) fabric. The fabric includes polyester thread stitching, and a PU sealing band is disposed on the stitching to ensure the integrity of the seams. To provide an adaptable and hermetic seal with a mask, the hood further comprises a pair of elastic bands disposed on the polyurethane fabric. These bands define a 20 mm channel between them. A double-sided tape is disposed within this channel and is configured to adhere the polyurethane fabric directly to the edge of a full-face mask, thereby creating a secure, hermetic seal. In one embodiment, this sealing structure, comprising the elastic bands, channel, and tape, is disposed on the fabric independent of other features, such as a frontal opening.

In another embodiment, the hood further comprises a frontal opening. In this embodiment, the pair of elastic bands are disposed along a diameter of the frontal opening. The bands are configured to provide resistance and elasticity to the opening, allowing the hood to flexibly stretch and conform to the perimeters of different full-face mask models.

DETAILED DESCRIPTION OF THE DRAWINGS

These and other features, aspects, and advantages of the present invention will become better understood with regard to the following description, appended claims, and drawings where:

FIG. 1: EPAS HOOD for neck and head protection with resistance to contaminated environments, such as sulfuric acid, suspended dust, chemical mining dust, and other environmental agents.

Figure 2:
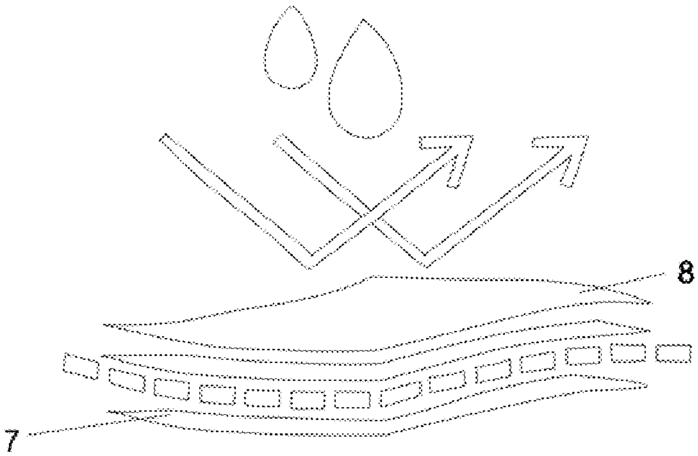

FIG. 2: Sketch of patterns duplicated for anti-acid and paper EPAS HOODS, both show identical dimensions and manufacturing techniques. Only the textile material to be used will vary.

Figure 3:
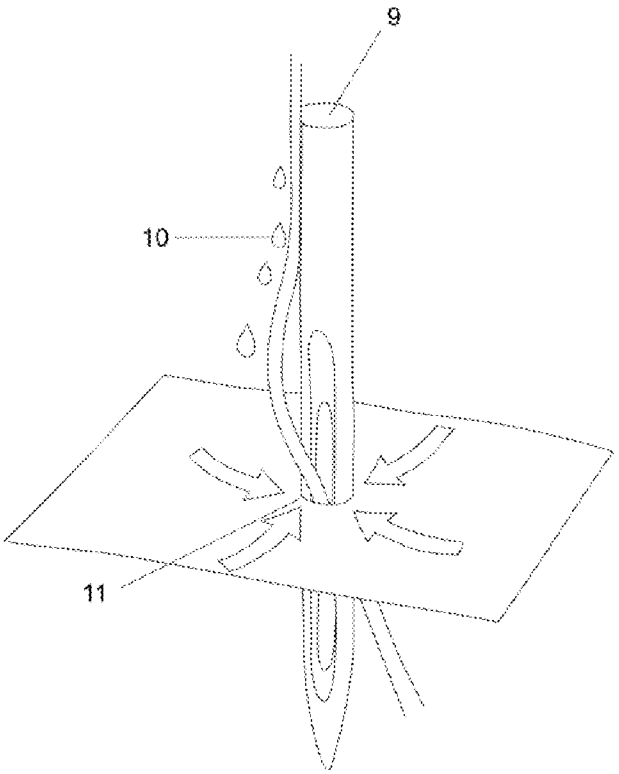

FIG. 3: 3M™ Versaflo™ Hood for exclusive use as Replacement S-605-10.

Figure 4:
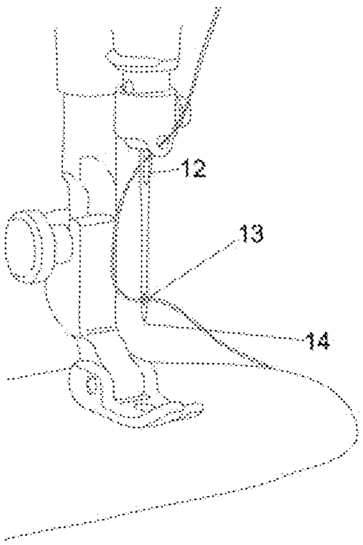

FIG. 4: Anti-acid hood for exclusive use with BLS 5700/c visor.

Figure 5:
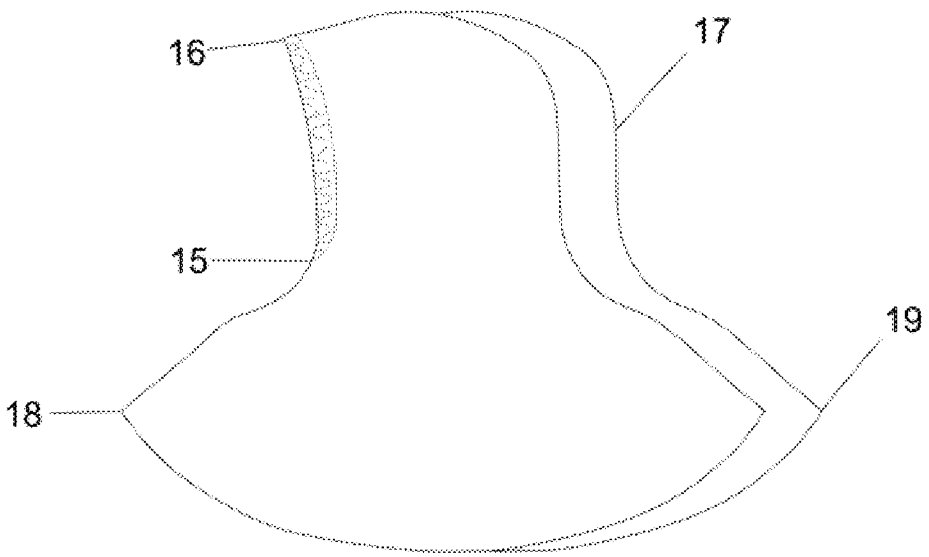

FIG. 5: Full-body paper suit with opening in the neck area.

Figure 6:
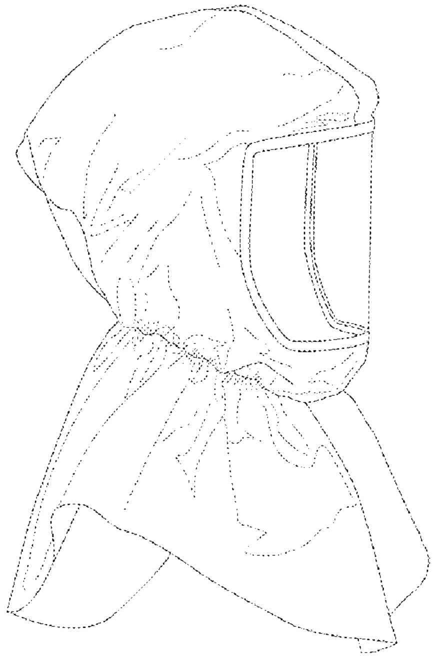

FIG. 6: Close-up FIG. 3 failure point opening neck opening zone.

Figure 7:
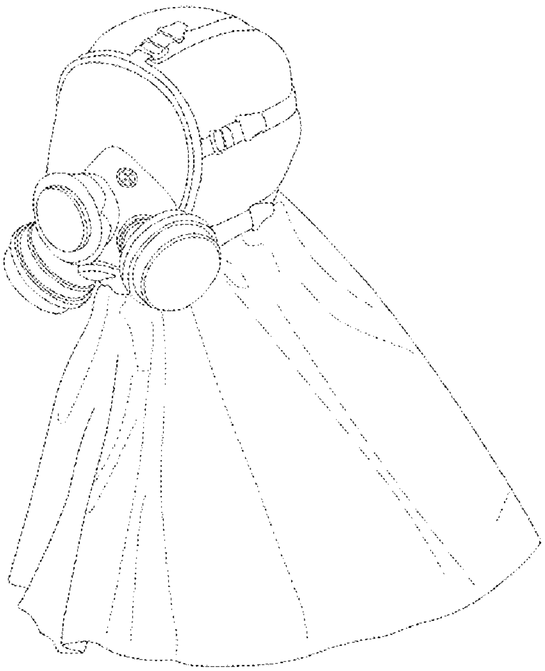

FIG. 7: Improvised seals at opening points on market hoods.

Figure 8:
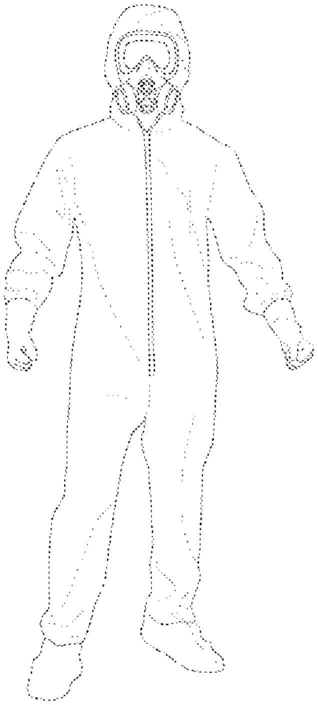
Figure 9:
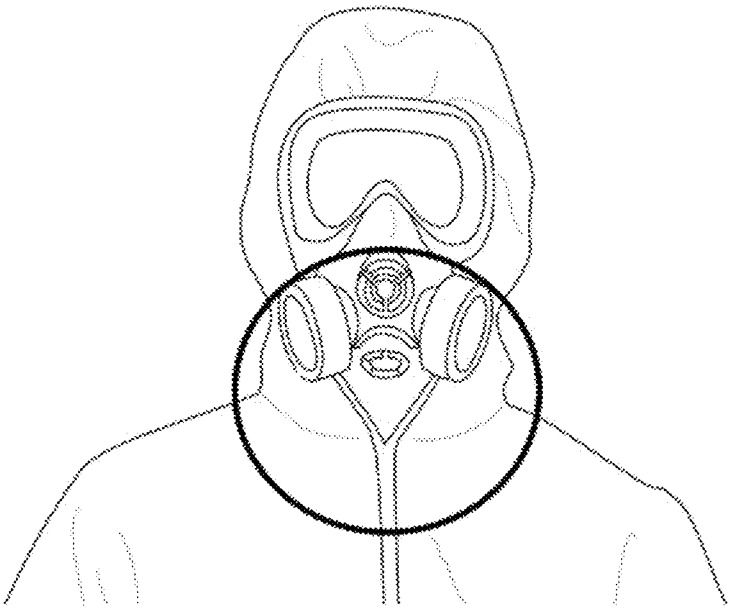
Figure 10:
Figure 11:
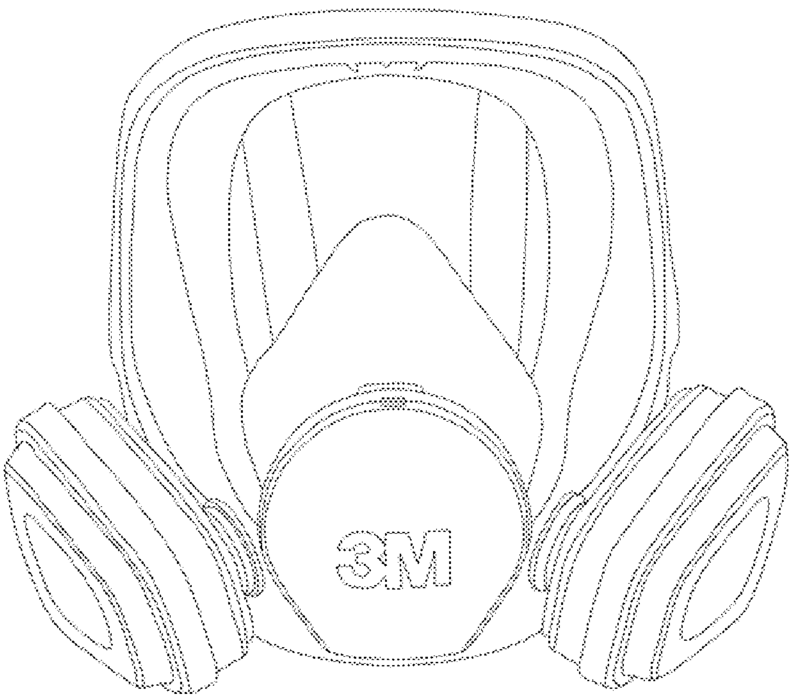
Figure 12:
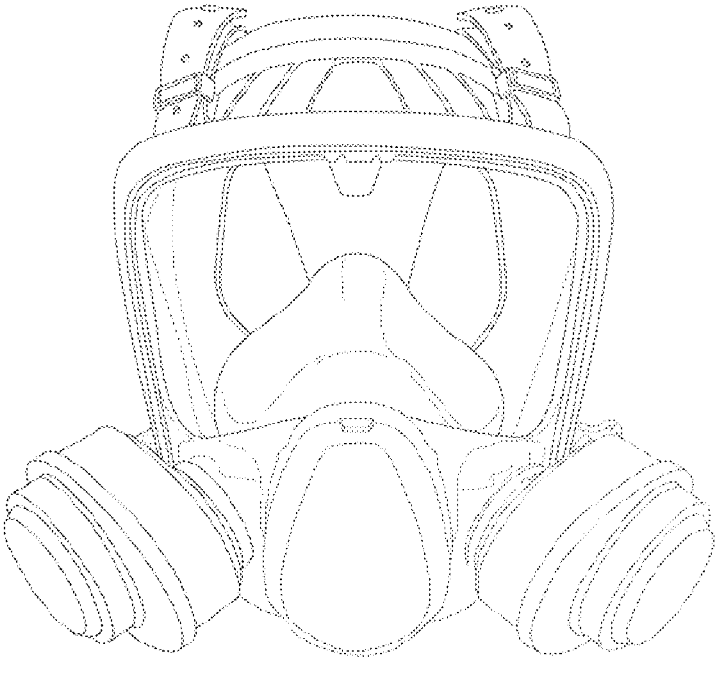
Figure 13:
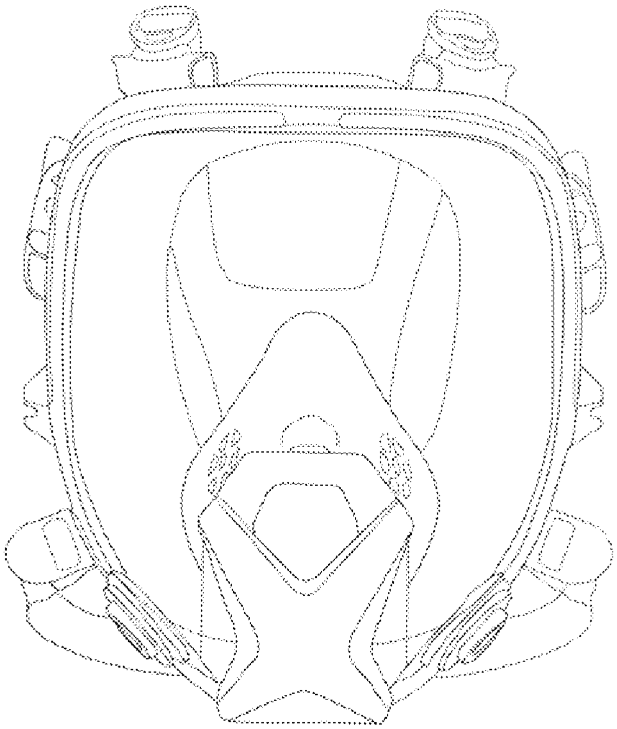
Figure 14:
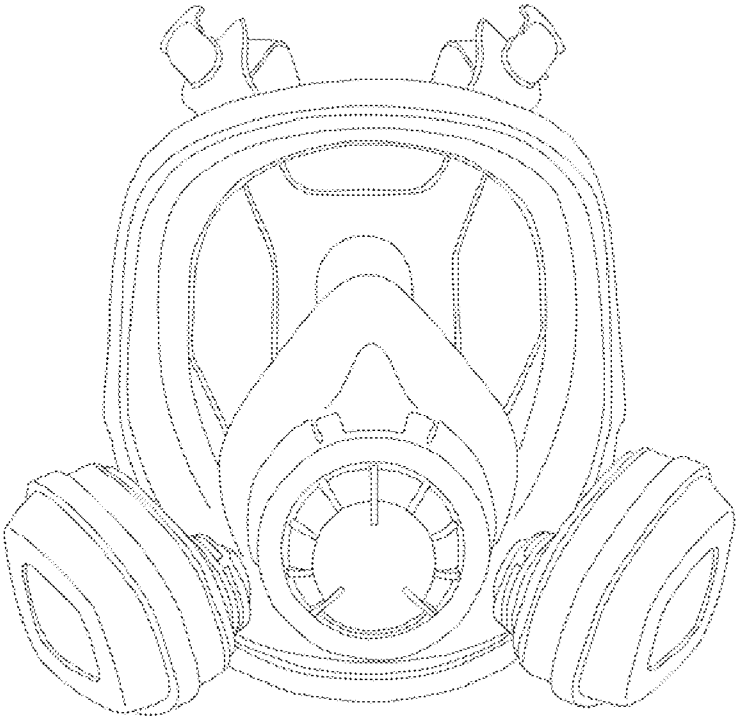
Figure 15:
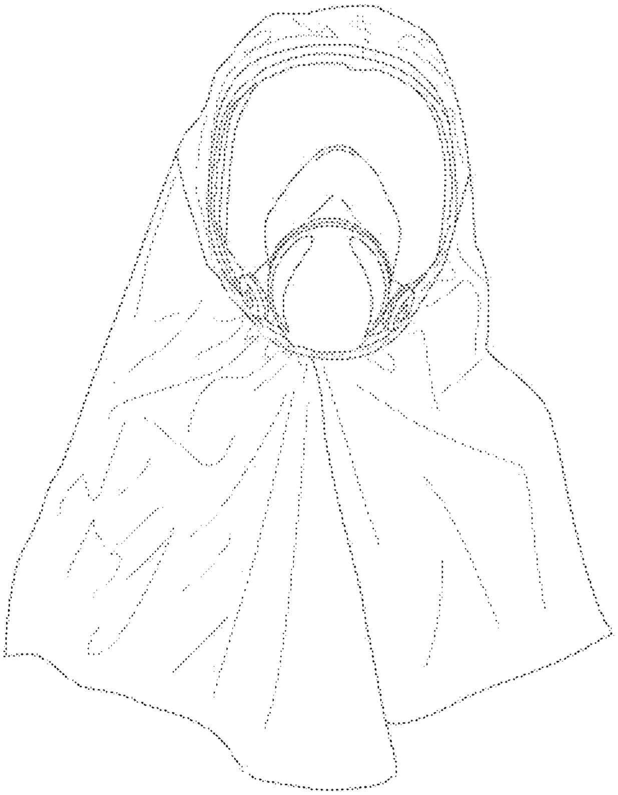

FIGS. 8. 9, 10, and 11: Types of full-face masks to which the EPAS HOODS can be adapted.

Figure 16:
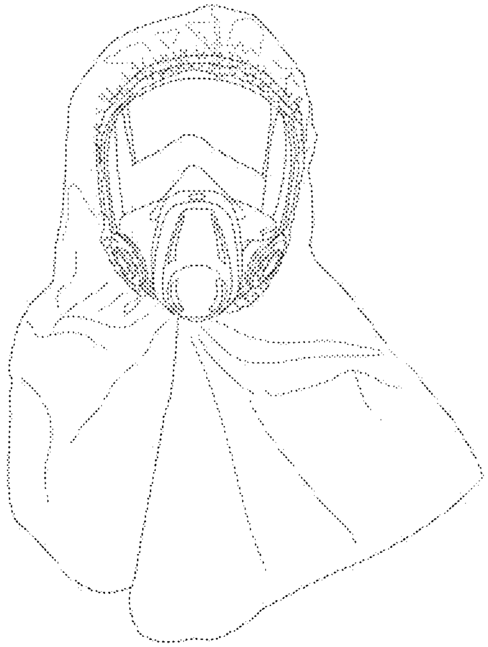
Figure 17:
Figure 18:
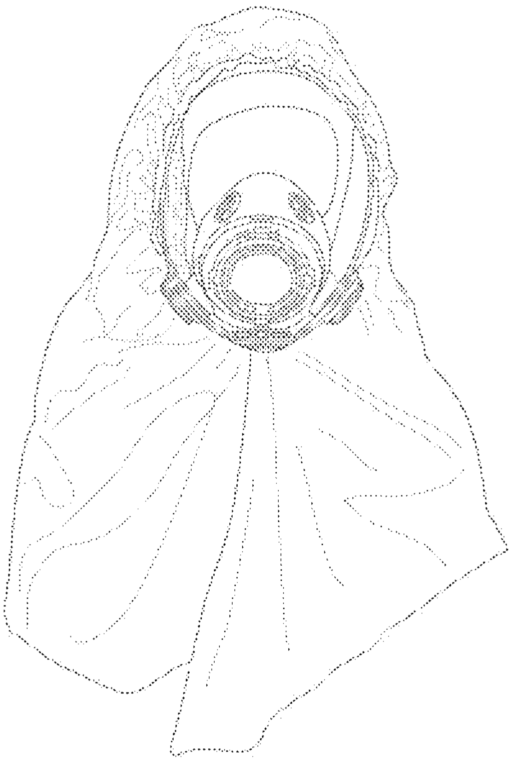

FIGS. 12, 13, 14, and 15: Full-face masks of different models with anti-acid EPAS HOODS installed, and FIGS. 16-18 illustrate additional embodiments of the EPAS hood installed on a full-face mask, showing variations in positioning, fit, and sealing engagement of the hood relative to the mask interface, including frontal and angled views demonstrating the adaptability of the elasticized opening to different mask geometries.

DETAILED DESCRIPTION OF THE INVENTION

The present invention seeks to create a safety hood in two different textiles: Polyethylene and PVC. The first, commonly known as a paper hood, serves to protect the worker's neck and head from dust and suspended particles, is disposable, and the second, washable and reusable, for the protection of personnel against work environments with acids in liquid and gaseous states.

The safety hood is composed of an anti-acid polyurethane fabric (1) which, in one embodiment, is waterproof, is coated in Pu/PVC with a Nylon mesh, and has a thickness or grammage of 310 grams per square meter (gsm). The anti-acid polyurethane fabric (1) includes polyester thread stitching (2) on the anti-acid polyurethane fabric (1). The polyester thread stitching (2) may be comprised of a 100% high-tenacity, 0.35 mm waxed polyester thread. This stitching may be a straight stitch with reduced seam puckering. A polyurethane sealing band (3) is disposed on the polyester thread stitching (2) to seal the seams. The polyurethane sealing band (3) may have a width of 18 mm. In sealing areas configured to engage a full-face mask, the hood has a pair of elastic bands (4) disposed on the anti-acid polyurethane fabric (1). The pair of elastic bands (4) may be composed of a latex and have a width of 0.5 mm. It has a 20 mm channel (5) defined between the two elastic bands (4) where it has a double-sided tape disposed within the 20 mm channel (5). This double-sided tape is configured to adhere the anti-acid polyurethane fabric (1) to the edge of the full-face mask (6) and generate the hermetic seal. In one embodiment, this sealing structure, comprising the pair of elastic bands (4), the 20 mm channel (5) defined therebetween, and the double-sided tape disposed within the channel (5), may be disposed on the anti-acid polyurethane fabric (1) independent of other features, such as a frontal opening, to provide a versatile sealing mechanism.

The basic pattern of this hood is that it is framed in the lower frontal opening (7), passing through the upper frontal opening (8). The lower frontal opening (7) is the opening corresponding to the face that extends to the upper frontal opening (8). This opening, which is rigid in other models, is sewn with high-resistance, acid-resistant elastics, which may be a high-resistance latex, and with a double axis, which creates a flexible opening of the pair of elastic bands (4). As such, in this embodiment, the pair of elastic bands (4) are disposed along a diameter of the frontal opening and are configured to provide a resistance and an elasticity to said frontal opening. The segment posterior to the face corresponds to the nape protection zone (9) being the part of the hood that will be in direct contact with the nape area of the neck, over the shoulders. The front neck protection zone, which is next to the lower frontal opening (7) will protect the neck in its front segment. The lower segments indicate the length of the hood, with the lower front segment (10) being the lowest front segment that will protect the worker's chest down to the ribs, while the lower posterior segment (11) corresponds to the lowest rear segment that will protect the worker's upper and mid-back.

In the case of the anti-acid PVC hood, its use is ideal in sectors where there is exposure to acid agents. A good example of these environments is sulfuric acid plants in mining operations, as this component plays an important role in the leaching of oxidized copper minerals. Critical points in these facilities, where acid concentration increases, are the primary and secondary absorption towers, drying towers, and a quench tower. On the other hand, regarding the paper hood, its use is suitable in work environments where there is particulate matter and suspended dust, and where the concentration and physical/chemical characteristics of these agents do not imply the degradation (in the short term) of the polyethylene textile (workshops, construction, mining).

The manufacturing of the pieces is done based on previously designed patterns, where the textile fibers of the hoods are superimposed, squaring them and marking key points for immobilization: lower frontal opening (7), upper frontal opening (8), nape protection zone (9), lower front segment (10) and lower posterior segment (11). Subsequently, the edges of the pattern are marked on the textile, cutting them along the entire contour already determined from lower frontal opening (7) to the lower posterior segment (11), to then take it to a double-stitching process on mechanized equipment (sewing machine) with high-chemical-resistance thread side polyester thread through the segments: upper frontal opening (8), nape protection zone (9), lower posterior segment (11), lower front segment (10) up to the lower frontal opening (7). Then, the same double-stitching procedure is repeated, changing the polyester thread for high-resistance and durable latex elastic for the segments of the lower frontal opening (7) and upper frontal opening (8).

Technical Advantages

One of the advantages of this equipment lies in its versatility, as it allows for its use in different models of full-face respiratory protection (3M full-face respirator series 6000, 6800, 6900, AIR FFS990 full-face respirator, MSA Advantage, Activex ATX 1500, BLS 5600 series, among others). Currently, there is no homologous anti-acid hood on the market, and, in general, workers exposed to acidic environments use paper suits, which come with a hood that is attached from the neck area. Unfortunately, the material of these suits does not provide sufficient protection and degrades quickly when exposed to environments of these characteristics. On the other hand, there are fabric hoods that are part of headpieces and self-contained breathing apparatuses. These latter, although they provide optimal protection, have the disadvantage of fabric hoods that are permeable upon contact with liquids, needing to be sent for cleaning with the additional disadvantage of the waiting time for new use. Clarifying this last point, the second advantage of this invention emerges, as, being made of a washable material, it can be quickly washed and dried to be used again.

The anti-acid hood is made of a high-strength and elastic polyamide core, coated in PVC. This configuration provides an impermeable membrane, which, together with its inner polyamide layer, offers high protection with elasticity and resistance. For its part, the polyethylene hood, better known as paper, is lightweight, comfortable, and breathable, which allows for the continuous flow of heat and perspiration from users. Like the anti-acid hood, it is detachable and allows for its use on all models of full-face visors available on the market. It is disposable, and can be used throughout the entire workday, except for accidents such as tears or material collapse due to complex environmental conditions (excessive contamination and dust).

The embodiments of the detachable hood for protection of a head, neck, and chest against exposure to contaminating agents are exemplary and numerous modifications, combinations, variations, and rearrangements can be readily envisioned to achieve an equivalent result, all of which are intended to be embraced within the scope of the appended claims. Further, nothing in the above-provided discussions of the detachable hood for protection of a head, neck, and chest against exposure to contaminating agents should be construed as limiting the invention to an embodiment or a combination of embodiments. The scope of the invention is defined by the description, drawings, and claims.

What is claimed is:

1. A detachable hood for protection of a head, neck, and chest against exposure to contaminating agents, comprising:
- an anti-acid polyurethane fabric;
- a polyester thread stitching on the anti-acid polyurethane fabric;
- a polyurethane sealing band disposed on the polyester thread stitching;
- a pair of elastic bands disposed on the anti-acid polyurethane fabric;
- a 20 mm channel defined between the two elastic bands; and
- a double-sided tape disposed within the 20 mm channel, wherein the double-sided tape is configured to adhere the anti-acid polyurethane fabric to an edge of a full-face mask.

2. The detachable hood of claim 1, wherein the anti-acid polyurethane fabric is waterproof and comprises a coating selected from polyurethane (PU), polyvinyl chloride (PVC), or a combination thereof, and further comprises a nylon mesh reinforcement layer and has a thickness of 310 grams per square meter.

3. The detachable hood of claim 1, wherein the polyester thread stitching comprises a 100% high-tenacity 0.35 mm waxed polyester thread.

4. The detachable hood of claim 3, wherein the polyester thread stitching is a straight stitch configured to reduce seam puckering during use.

5. The detachable hood of claim 1, wherein the polyurethane sealing band has a width of 18 mm.

6. The detachable hood of claim 1, wherein the pair of elastic bands are composed of a latex and have a width of 0.5 mm.

7. The detachable hood of claim 1, further comprising a frontal opening, wherein the pair of elastic bands comprise latex elastic bands having a predetermined resistance sufficient to maintain a sealing engagement with the full-face mask and are disposed along a diameter of the frontal opening, the pair of elastic bands are configured to provide resistance and elasticity to the frontal opening.

* * * * *